March 4, 1952  V. L. OESTNAES  2,588,154
HIGH-INTENSITY LIGHTING UNIT
Filed July 15, 1947  4 Sheets-Sheet 1
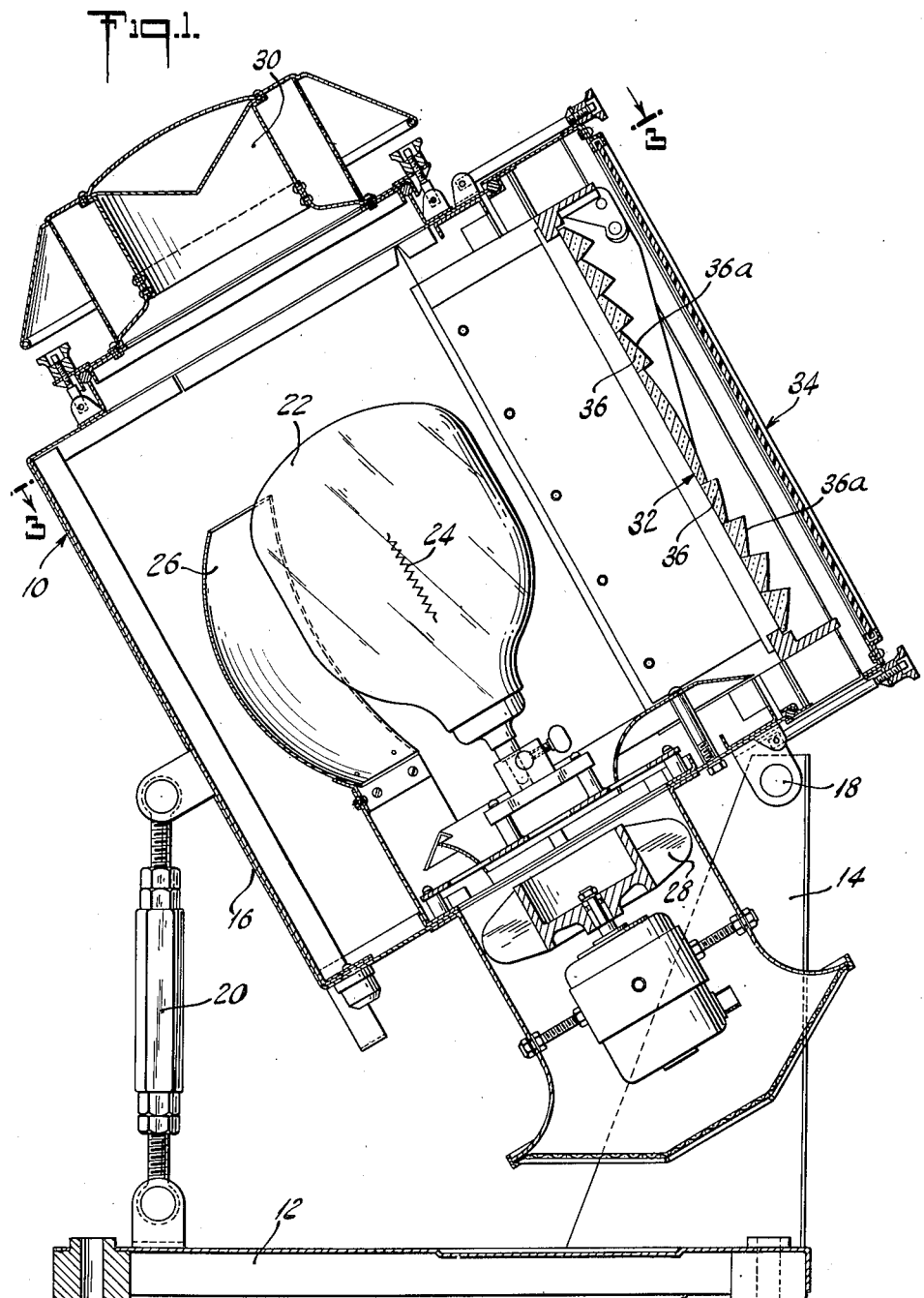

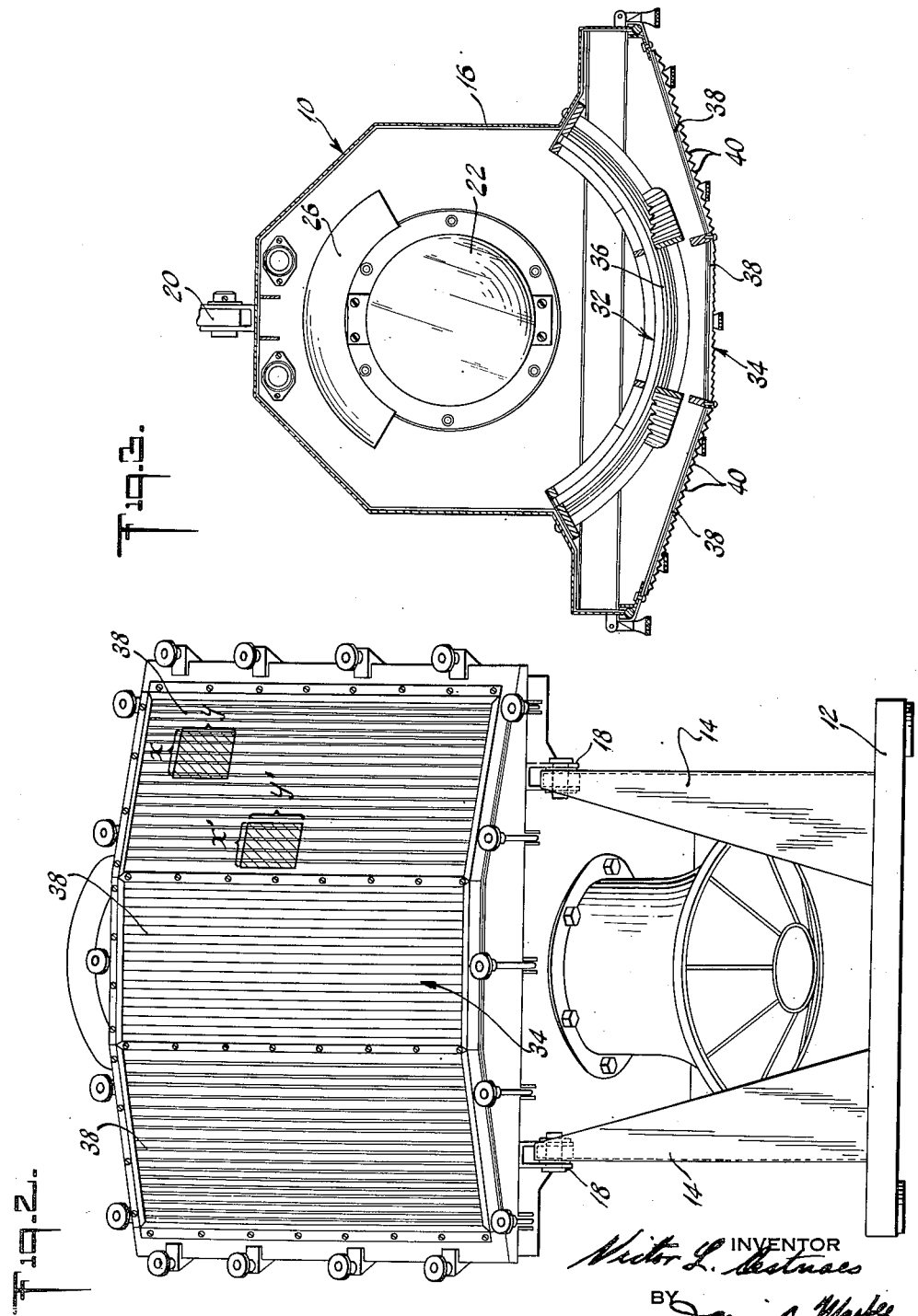

March 4, 1952  V. L. OESTNAES  2,588,154
HIGH-INTENSITY LIGHTING UNIT
Filed July 15, 1947  4 Sheets-Sheet 3
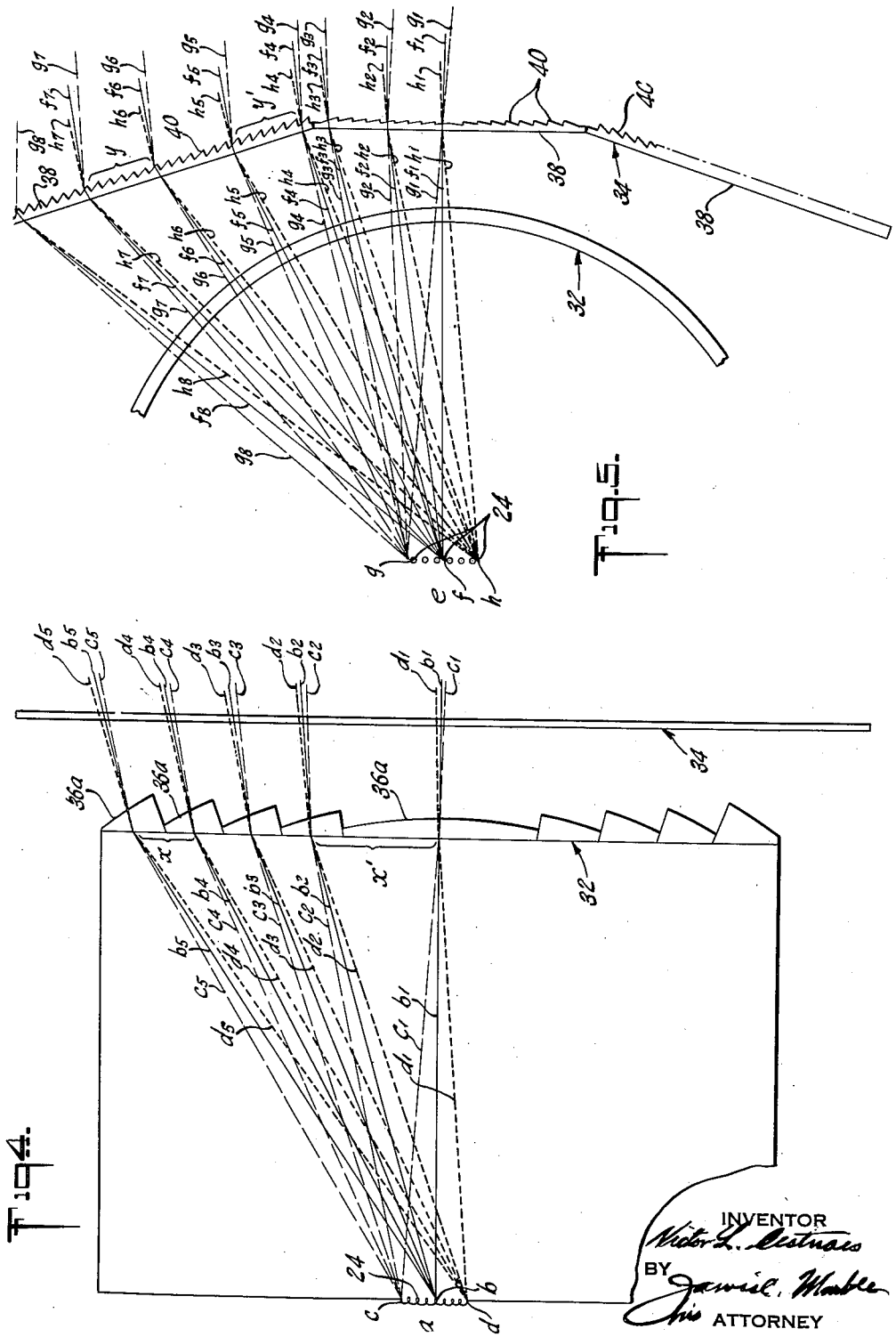

March 4, 1952  V. L. OESTNAES  2,588,154
HIGH-INTENSITY LIGHTING UNIT
Filed July 15, 1947  4 Sheets-Sheet 4
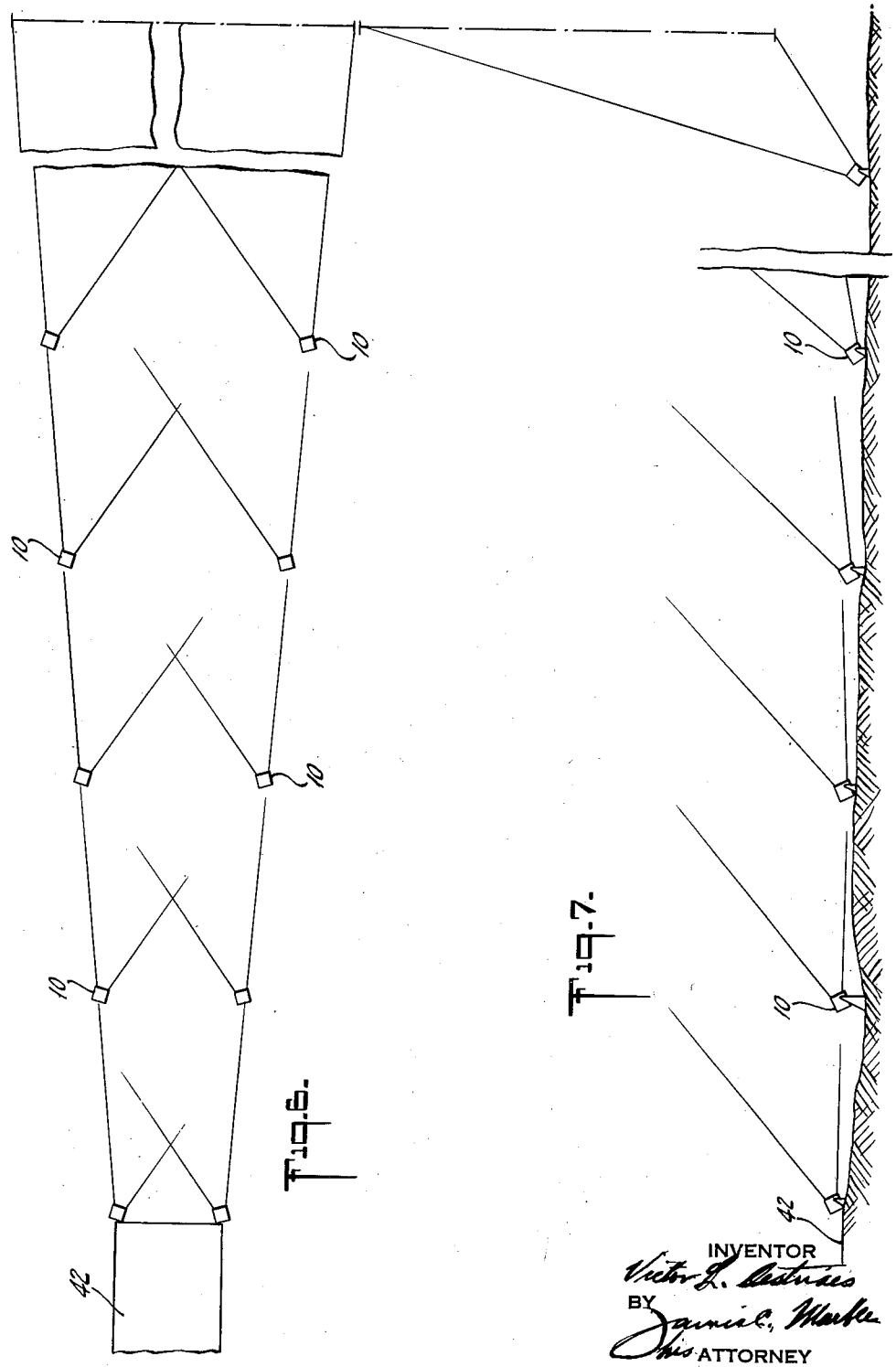

Patented Mar. 4, 1952

2,588,154

UNITED STATES PATENT OFFICE 2,588,154

HIGH-INTENSITY LIGHTING UNIT

Victor L. Oestnaes, Westfield, N. J., assignor to American Gas Accumulator Company, Elizabeth, N. J., a corporation of New Jersey Application July 15, 1947, Serial No. 761,140

6 Claims. (Cl. 240—1.2)

The present invention relates to lighting and has for a general object the provision of a new and improved high intensity lighting unit visible at a greater distance from the source by the unaided eye under conditions of low visibility than has heretofore been possible with lighting units requiring comparable energy input for maintaining the light source. A further object is the provision of such a lighting unit which will also afford substantially uniform intensity of lighting within the confines of a beam, the marginal rays of which have substantial divergence from the axis of the beam. A still further object of the invention is the provision of new and improved visual lighting for aiding the approach to and landing of aircraft under conditions of adverse or limited visibility.

Since the invention is particularly applicable as an aid to aircraft landing, it will hereinafter be discussed and described in connection with such use, although it is to be understood that the invention may have other uses.

In order that the nature of the invention, and the manner in which the above general objects and more detailed objects hereinafter appearing are attained, may most readily be understood, it is desirable first to consider certain of the factors upon which the principles of the invention are based in order to achieve its ends.

It is well known that the distance at which a light may be seen by the unaided eye is considered as a function of the total candle power emitted by an optical system, a threshold value, and the transmissivity of the atmosphere. The relationship between these four factors is commonly expressed by the following formula, known as Allard's law:

$$I = \frac{E \times D^2}{T^D}$$

in which:
I = candle power at the source;
E = illumination required for threshold visibility at unit distance;
T = transmission factor per unit distance;
D = distance expressed in unit distance.

This law is based on the premise that the light is emitted from a point source.

It is also known that while it is physically impossible to emit light from a mathematical point source, the anatomy of the human eye is such that this requirement of Allard's law does not have to be met in its entirety. Due to the fact that all parts of the eye have dimensions, it has been determined that light entering the eye within an included angle of a few minutes of arc (probably more precisely within a fraction of a minute) may be considered as coming from a point source. The actual numerical value of this included angle is subject to some difference of opinion between the investigators of this phenomenon but this fact has no particular significance as to the present invention as long as it is established (as it is) that the numerical value is measured in minutes of arc and not in degrees.

Under ordinary weather conditions, this limitation on the size of the light source is of no consequence because practical limitations on the size of the optical system and the distance at which the light is observed are such that the light from the whole area of the optical system may be considered as entering the eye well within the critical included angle.

However, this condition does not prevail when a light is observed through dense fog. In such cases, the range of visibility is measured in feet rather than miles, and with the size of the optical system having a value on the order of from a fraction of a foot to perhaps 3 or 4 feet or more, the effect of this included angle results in that only a portion of the light emanating from the optical system enters the eye within its critical angle.

Therefore, only a portion of the total light emitted may be considered when calculating the range of visibility, and this invention utilizes this fact to the utmost. It is particularly applicable when the light from a light source is intended to cover an appreciable angle in space rather than to obtain maximum range of visibility within very narrow angles. In the latter case any optical system, be it reflectors, lenses, or combinations of the two, is designed to produce a beam consisting of parallel rays emitting from a point source. Due to the fact that any light source, whether it be an arc, an incandescent lamp filament, a gas flame, or a luminous tube, has size, a minimum divergence of the emitted light is unavoidable, the amount of which is dependent on the size of the light source, the focal distance of the optical system and the quality of the surface treatment given to the optical elements.

To obtain a wider angular coverage in space, any one of these three contributing factors may be varied. A relatively larger light source, a relatively shorter focal distance, and a relatively diffusing treatment of the optical surfaces will produce an increased angular coverage in combination or by themselves, as chosen by the designer.

The result invariably is the same. The increased angle of coverage is obtained from all points of the optical system and the resultant combination is one in which the eye looking into the light source from a relatively short distance will see the optical system as a surface, and not as a point source, and the Allard law does not apply.

On the other hand, if the smallest light source, the longest focal distance and the best treatment of the optical surfaces practical for a given case be combined with an optical system of such nature that adjacent light rays are emitted at some predetermined angular relationship to each other, the desired total coverage may be obtained with the advantages that the maximum amount of light will enter the eye well within the critical angle, and Allard's law will apply for that portion of the light which leaves the optical system within its critcal angle.

With these principles in mind, reference may now best be had to the ensuing portion of this specification and the accompanying drawings forming a part hereof, descriptive of apparatus suitable for carrying the invention into effect and the use of such apparatus for approach lighting for aircraft landing strips.

In the drawings:

Fig. 1 is a vertical sectional view of a lighting unit embodying the invention;

Fig. 2 is a front elevation of the lighting unit shown in Fig. 1;

Fig. 3 is a section taken on the line 3—3 of Fig. 1;

Fig. 4 is a diagram illustrative of the light emission from the unit in vertical plane;

Fig. 5 is a diagram similar to Fig. 4 illustrative of the light emission in horizontal plane; and Figs. 6 and 7 are all diagrammatic views illustrative of an approach lighting system for an aircraft landing strip utilizing the principles of the invention.

Referring now to the drawings, the light unit shown in Fig. 1 and related figures, and designated generally at 10, is an example of a unit suitable for use as an airport approach light. It comprises a base 12 supporting brackets 14 to which the housing 16 is pivotally attached at 18. An adjustable support in the form of a turnbuckle 20 is provided to provide control of the angle from the horizontal at which light from the unit is emitted.

The housing 16 suitably supports the light source, which in the present instance, is in the form of an incandescent light bulb 22, having a series of filaments 24 constituting the actual light source and supplied with current through the usual electrical leads. An arcuate reflector 26 reflects back to the source the light rays emitted rearwardly from the source. Preferably, as shown, the reflecting surface is spherically curved with the center of curvature located at the center of the light source. Because of the heat generated by the source the unit is cooled by forced draft generated by the motor driven fan 28, the air being exhausted through the vent 30 at the top of the housing.

The optical system comprises two separate refractors generally designated at 32 and 34 respectively and for convenience hereinafter referred to as the inner and outer refractors. In the embodiment shown, the inner refractor 32 is in the form of a Fresnel lens consisting of a number of lens members 36 having curved lens surfaces 36a. Preferably, for reasons hereinafter discussed, the refractor 32 is constructed of clear ground and polished glass. As will be observed from the drawings the lens members 36 extend horizontally.

The outer refractor in the present embodiment comprises three plane panels 38, each providing a series of plane vertically extending prism surfaces 40. For reasons also hereinafter given, the outer refractor is preferably made of a molded thermoplastic material such as "Lucite," and may be clear or colored. The mechanical construction of the lighting unit may vary widely, within the scope of the invention and the mechanical details of the present embodiment have therefore not been described in great detail herein. Also, as will hereinafter appear, the principles of the invention may be incorporated in units embodying optical systems the materials and details of design of which may differ considerably from those just described.

Referring now more particularly to Figs. 4 and 5, the manner in which the apparatus functions to achieve its desired ends is illustrated by the diagrams embodied therein.

Fig. 4 is illustrative of the nature of the light emission in vertical plane through the inner refractor, the outer refractor not appreciably affecting the direction of emission of the light rays in this plane. The light source is indicated by the filaments 24, the vertical extent of the source being indicated by the dimension $a$, the vertical center of the source being at point $b$, located on the axis of the optical system midway between point $c$, at the top of the light source and point $d$, at the bottom of the source.

For clarity of illustration in the diagram, only the rays passing through the median point of each lens surface are shown, these being sufficient for explanation of the principles involved. If we now consider the ray $b_1$ emanating from the center point $b$ of the source along the axis of the system, this ray is undeflected and is emitted along the axis of the optical system. If now we consider the ray $c_1$ emitted from point $c$ at the top of the source, this ray is deflected so as to follow the line indicated which diverges in the vertical plane from the median ray $b$. Likewise the ray $d_1$ emanating from the bottom point $d$ of the source is deflected to diverge vertically along the line indicated from the median ray $b$.

Similarly, if we consider the rays, $b_2$, $c_2$ and $d_2$; $b_3$, $c_3$ and $d_3$; $b_4$, $c_4$ and $d_4$; etc., passing respectively through the median points of the several lens elements, median beams $b_2$, $b_3$, $b_4$, etc., diverge with respect to each other and with respect to the median or axis beam $b_1$ of the system. Also, the rays $c_2$, $c_3$, $c_4$, etc., and the rays $d_2$, $d_3$, $d_4$, etc., emanating from the top and bottom limits of the light source, diverge from the respective median rays in substantially the same manner as rays $c_1$ and $d_1$ diverge from the ray $b_1$. While in order to avoid confusion in the diagram, rays emanating from the top, center and bottom points of the source and passing through the respective lens members at other than their median points, have not been shown, it will be evident from inspection that these rays will be similarly deflected to follow lines in the vertical plane lying at angles intermediate the angles of the rays shown. With this arrangement, each lens surface may be said to project a separate beam the median ray of which diverges with respect to the median ray of adjacent beams. Also, as will be apparent, the divergence of the rays such as the rays $c_2$, $c_3$, $c_4$ and $d_2$, $d_3$, $d_4$, emanating from the upper and lower limits of the source and passing through the marginal portions of the lens members, and constituting the marginal rays of each beam in the vertical plane, will overlap the marginal rays of the adjacent beams so that the whole of the intended field of the light is covered.

In addition to the above considerations, a further and highly important factor is embodied in the lens design in order to achieve the primary object of the invention. This is the shaping and positioning of the surfaces of the lens members so that the maximum vertical distance in the plane of the reflector (the plane of emission) between any two rays which do not diverge relative to each other, is relatively very small as compared with the vertical dimension of the refractor, and ordinarily a little or at most only a very few times greater than the vertical height of the light source.

In the design shown in the diagram, the lens surfaces are shaped and positioned so that the rays $d_3$ and $c_5$ are substantially parallel, rays $d_2$ and $c_4$ are substantially parallel and rays $d_1$ and $c_2$ are substantially parallel. Between any two of these pairs of rays the intermediate rays are either substantially parallel or converging. Consequently, any observer standing in that part of the field bracketed by rays $d_3$ and $c_5$, for example in line with ray $b_4$, sees an apparent light source the vertical dimension of which is limited to the distance $x$, which in the present instance is shown as twice the height of the light source. The reason for this is that the rays emitted from the portions of the refractor vertically outside the beam vertically delimited by rays $d_3$ and $c_5$ diverge away from the observer and do not impinge the eye. Likewise an observer viewing the light from a position in the field bracketed by rays $d_1$ and $c_2$, sees an apparent light source the vertical dimension of which is only the distance $x^1$. An observer viewing the light from intermediate positions will likewise see an apparent light source the vertical dimension of which is limited to the vertical distance between non-divergent rays, which over the vertical extent of the refractor is substantially constant, in the present instance the distance $x$.

The design of the outer refractor 34 is made so that in the horizontal plane its action is essentially the same as that of the inner refractor 32 in the vertical plane, as will be seen from Fig. 5. In this figure the horizontal extent of the light source is indicated by distance $e$, the mid-point $f$ being located on the optical axis equidistantly from the marginal points $g$ and $h$. The rays from the source pass through the inner refractor 32 without appreciable deflection, and are deflected in this plane by the refractor 34 so that the median rays $f_1$, $f_2$, $f_3$, etc., of the beams diverge progressively from the optical axis, while the marginal rays of each beam overlap the marginal rays of adjacent beams, so that the whole field is covered in the horizontal plane. Also, the prism surfaces 40 are located so that the maximum horizontal distance between any two non-divergent rays is relatively very small as compared with the horizontal extent of the refractor. In the embodiment shown this distance is illustrated by way of example at $y$ and $y^1$.

If we now consider the effect produced by the system just described it will be apparent that an observer standing anywhere within the field of illumination will see an apparent light source of very limited dimensions both horizontally and vertically, such for example as might appear at $xy$ or $x^1y^1$ (Fig. 2) depending upon the position of the observer. This apparent source area is so small that from any distance within the intended range of use of the light, the arc subtended by the rays from the whole source and impinging the eye of the observer is a matter of a fraction of a minute or a very few minutes at the most, the value of the arc of course increasing as the distance of the observer from the light decreases. Thus there is projected toward the eye of the observer the full intrinsic brilliance of the source (less only the slight loss incurred due to the fact that the efficiency of the refractors in passing the light rays is less than 100%) in a form which the eye is capable of fully or substantially fully accepting. The net result is that for a light source having a given energy and intrinsic brilliance, a light unit embodying the invention will (1) provide visual indication over the field embraced by a divergent beam, and (2) provide greater penetration under adverse atmospheric conditions to an observer within that field than can a unit having an actual source of like power and brilliance, the rays from which are emitted from an apparent source the size of which subtends a large arc as viewed by the observer.

In the specific design which has been described, the inner refractor is of glass, comprising a comparatively small number of curved lens surfaces 36a, while the outer refractor is formed by a series of plane panels of plastic material providing a comparatively larger number of prism surfaces 40. So far as the underlying principles of the invention are concerned, the materials of which the refractors are made and the specific number and profile of the refracting surfaces (within design limits) are not critical. The accuracy of the optical elements is, however, important, if maximum utility is to be secured, since the less the diffusion, the more readily the minimum size of apparent light source is obtainable. In the present example, which is for a unit suitable for use as a runway approach light, a light source having an energy input of the order of five kilowatts is appropriate and the resultant heat produces temperature condition such that even with forced cooling, an inner refractor of glass is the most practical and desirable and if glass is used, cost considerations limit the desirable maximum number of lens units used. On the other hand, if temperature conditions permit, cost and other considerations make the use of recently developed and accurately molded thermoplastic refractors desirable. Such elements may be molded in comparatively large units, such as the panels 38, each including a number of refracting surfaces such as the surfaces 40. Consequently, these surfaces can without undue expense be made individually comparatively narrow and because of that can also be made plane prism surfaces, rather than as curved lens surfaces, while at the same time enabling the designer to obtain the desired character and relation between the beams emitted from each surface. The use of plane rather than curved surfaces in such case is dictated solely by considerations of cost in producing the molds necessary for forming the refractor.

So far as the specific design of the refractors is concerned, it will be apparent that this will be governed in individual cases by the specific use for which the unit is intended, which involves the size and type of light source, the divergence of field to be covered and the range of distance from the unit at which observation of the light is desired. The latter factor influences the desired size of the apparent light source produced by the optical system which in turn is influenced by the focal length of the optical system in relation to the actual size of the light source. The relation of these several factors are however well known to those skilled in the optical art, so that given the principles to be followed as above outlined, the production of an optical system embodying the invention and productive of its advantages in any specific application, is a matter only for known optical calculation.

As previously noted, lighting units of the kind described are of particular utility as approach lights for aiding the landing of aircraft by visual guidance under adverse weather conditions productive of limited visibility.

Electronic and other blind flying aids to navigation theoretically are capable of providing a guide enabling a pilot to follow blindly an approach or glide path to a landing, but practically the precision of such means in its present state of development, coupled with the human factor involved, does not provide sufficient certainty to make such landing procedure safe. Airports equipped with aids to instrument landing ordinarily provide one or more signals enabling a pilot to know when he has approached to a given distance from the end of the landing strip. One of these signals is usually about three thousand to thirty-five hundred feet from the approach end of the strip and it has been found from experience that a pilot can make a blind approach by instrument so that with reasonable certainty the craft will pass through a window or portal some seven hundred feet wide by four or five hundred feet high (with its lower edge some one hundred to one hundred and fifty feet above ground level), at this distance from the strip. The problem is thus to guide with certainty a craft passing through such a portal to a landing on a strip which ordinarily is not greatly in excess of, and which may be as little as, one hundred feet in width and to accomplish this with maximum safety, visual or contact flying is most desirable if not a requisite.

The manner in which this may be accomplished by the present invention is generally illustrated by the diagrams of Figs. 6 and 7, showing a preferred arrangement of lighting units serving as runway approach lights. In these diagrams the approach end of the runway is indicated at 42, with the lighting units 10 arranged in two diverging lines in the plane of the runway as shown in Fig. 6. These lines of units are also preferably located in the plane of the runway or strip as shown in Fig. 7, pedestals or towers 44 being used to compensate for variations in the terrain along the approach path.

For approach lighting purposes, units designed to provide a beam giving visual indication within an included angle of approximately 40° in both horizontal and vertical planes are preferably provided, the unit hereinbefore described providing a beam of such divergence.

Advantageously the units are located along lines diverging from the axis of the runway by approximately 5° in the horizontal plane, with the outer marginal rays of the beams coinciding with these lines. Also the units are adjusted so that the beams are projected upwardly at greater angles to the horizontal as the distance of the units from the strip increases.

As previously noted, a five kilowatt source is appropriate and with units of such power, spacing of the units at intervals of two hundred feet or thereabouts, to a distance of some three thousand feet from the approach end of the strip has been found satisfactory. As will be seen from the diagrams, an arrangement such as that described will provide coverage for any glide path starting from within the confines of a portal which can be reached with reasonable certainty, to the landing strip.

It has been found that for visual landing approach aid, visibility of the aiding light should be at least of the order of approximately one thousand feet under adverse weather conditions of fog or the like and experimental work recently carried on shows that an apparent light source of approximately five inches diameter and subtending an arc of about one minute at one thousand feet is substantially fully effective from the standpoint of the receptivity of the eye of the rays emitted from the source.

An incandescent light source of the power previously noted requires a source area approximately that of a one and one-half inch circle, so that to obtain best results for the purpose under discussion the lighting units should be designed so that in terms of linear dimensions the apparent light source is not greater than approximately three times the dimensions of the actual source. Ordinarily, however, and to the extent design conditions and the nature and size of the actual light source permit, an even smaller ratio between the sizes of the actual and apparent light sources is desirable, since the smaller the latter can be made the closer the range at which the light will be most effective because of subtending a very small arc.

With an approach lighting arrangement of the kind described, a pilot, even under conditions requiring an instrument landing, should pick up the outer approach lights before reaching the place of receiving the signal indicating his distance from the runway, provided he is on his proper course. Thereafter, successively closer lights serve to guide him in. If, at the time of receiving the distance signal no lights are visible, the indication is that the craft is off course and a new approach to the portal should be made. Because of the sharp delineation of the field in which visual indication is given by lighting units embodying the invention, any divergence of the craft from a path leading to the runway, once the outer lights have been picked up, is immediately apparent. While one line of lights may be used, the arrangement illustrated is preferable, since it also aids the pilot in checking and if necessary correcting the lateral level of his craft. Further, with two lines of lights, the lights of the two lines may be colored differently to indicate the proper approach path is between them.

Obviously, lighting units embodying the invention are not limited in their use to runway approach lighting, and other uses may dictate sizes, powers and kinds of light sources, including beam angles and intended ranges of use other than those described herein by way of example. Such variations, however, may be made without departing from the principles of the invention.

Also, while to a certain extent the principles of the invention may be applied to concentric lens systems, the preferred system and that which gives the most effective results is of the kind described in which control of the light rays is in two steps resulting in a practically square light pattern.

While for purposes of disclosure preferred apparatus has been described and illustrated here-

I claim:

1. A lighting unit comprising a housing, a light source mounted within said housing, an optical system for projecting light from said source to cover a predetermined field diverging with respect to the axis of the system said system comprising an inner refractor mounted in said housing, said inner refractor having a plurality of refracting surfaces through which light rays from said source pass, said refracting surfaces being constructed and arranged to project a plurality of overlapping beams diverging in one plane, an outer refractor mounted in said housing, said outer refractor having a plurality of refracting surfaces through which the beams projected by said inner refractor pass, the refracting surfaces of said outer refractor being constructed and arranged to project a plurality of overlapping beams diverging in a plane normal to said first plane, the refracting surfaces of both said refractors being so located relative to said source that the maximum distance in either plane between non-diverging rays as emitted from said system is so limited that the apparent light source subtends not more than a few minutes of arc as viewed from any aspect point in said field within the normal intended range of use of said unit.

2. A unit as set forth in claim 1, in which the distance of said refracting surfaces and their arrangement relative to the light source produces an apparent light source the linear dimensions of which do not exceed approximately three times the linear dimensions of the actual light source.

3. A unit as set forth in claim 1, in which the included angle of said field in both of said planes is of the order of 40°.

4. A unit as set forth in claim 1, in which the inner refractor comprises glass members providing curved refracting surfaces and the outer refractor comprises a molded thermoplastic material providing plane refracting surfaces.

5. A unit as set forth in claim 1, in which at least one of the refractors comprises a plurality of plane panels each providing a plurality of plane refracting surfaces, said panels being angularly mounted with respect to each other in a plane normal to the lengths of said surfaces.

6. A unit as set forth in claim 1, in which an arcuate reflector is provided for redirecting certain of the light rays from said source back to the source.

VICTOR L. OESTNAES.

REFERENCES CITED

The following references are of record in the file of this patent:

UNITED STATES PATENTS

| Number | Name | Date |
| --- | --- | --- |
| 1,337,880 | Benard | Apr. 20, 1920 |
| 2,155,295 | Bartow | Apr. 18, 1939 |
| 2,184,004 | Pennow | Dec. 19, 1939 |
| 2,284,878 | McDowell | June 2, 1942 |
| 2,329,557 | Rolph | Sept. 14, 1943 |
| 2,344,153 | Leonard | Mar. 14, 1944 |